United States Patent [19]
Butzin et al.

[11] Patent Number: 5,215,705
[45] Date of Patent: Jun. 1, 1993

[54] NUCLEAR FUEL BUNDLE SPACER SPRING FORCE GAUGE

[75] Inventors: Donald F. Butzin; William C. Peters; William B. Gaylord, Jr.; Robert K. Williams, all of Wilmington, N.C.

[73] Assignee: General Electric Company, San Jose, Calif.

[21] Appl. No.: 659,664

[22] Filed: Feb. 25, 1991

[51] Int. Cl.⁵ .............................................. G21C 17/00
[52] U.S. Cl. .................................... 367/247; 376/245
[58] Field of Search ................... 376/245, 247, 441; 73/161

[56] References Cited

U.S. PATENT DOCUMENTS

| | | | |
|---|---|---|---|
| 4,108,719 | 8/1978 | Olshausen | 376/245 |
| 4,246,783 | 1/1981 | Steven et al. | 73/161 |
| 4,668,466 | 3/1987 | Rylatt | 376/245 |

FOREIGN PATENT DOCUMENTS 923638 3/1973 Canada .
3242407A 5/1984 Fed. Rep. of Germany .

Primary Examiner—Donald P. Walsh
Assistant Examiner—Meena Chelliah
Attorney, Agent, or Firm—Robert R. Schroeder

[57] ABSTRACT

To measure fuel rod-centering forces exerted by double-acting springs assembled with different pairs of ferrules in a nuclear fuel bundle spacer, a gauge is provided to include an alignment rod and a probe carried by a handle for insertions into the ferrules of a ferrule pair. The alignment rod loads the side of the spring acting in its ferrule, while the other spring side exerts its fuel rod-centering force on a plunger mounted in the probe. The plunger is mechanically linked to a load cell which provides an electrical readout of the spring force.

12 Claims, 1 Drawing Sheet

NUCLEAR FUEL BUNDLE SPACER SPRING FORCE GAUGE

BACKGROUND OF THE INVENTION

Nuclear power reactors are a well known source of energy. In one type of nuclear reactor the nuclear fuel is comprised of elongated rods formed of sealed cladding tubes of suitable material, such as a zirconium alloy, containing uranium oxide and/or plutonium oxide as the nuclear fuel. A number of these fuel rods are grouped together and contained in an open-ended tubular flow channel to form a separately removable fuel assembly or bundle. A sufficient number of these fuel bundles are arranged in a matrix, approximating a right circular cylinder, to form the nuclear reactor core capable of self-sustaining a fission reaction. The core is submerged in a fluid, such as light water, which serves both as a coolant and as a neutron moderator.

A typical fuel bundle is formed by an array of spaced fuel rods supported between upper and lower tie plates; the rods typically being in excess of ten feet in length, on the order of one-half inch in diameter and spaced from one another by a fraction of an inch. To provide proper coolant flow past the fuel rods it is important to maintain the rods in precisely controlled, spaced relation such to prevent bowing and vibration during reactor operation. A plurality of fuel rod spacers are thus utilized at spaced intervals along the length of the fuel bundle for this purpose.

Design considerations of such fuel rod bundle spacers include the following: retention of rod-to-rod spacing, retention of fuel bundle shape, allowance for fuel rod thermal expansion, restriction of fuel rod vibration, ease of fuel bundle assembly, minimization of contact areas between spacer and fuel rods, maintenance of structural integrity of the spacer under normal and abnormal (such as seismic) loads, minimization of reactor coolant flow distortion and restriction, maximization of thermal limits, minimization of parasitic neutron absorption, and minimization of manufacturing costs including adaptation to automated production.

Commonly assigned Matzner et al. U.S. Pat. No. 4,508,679 discloses and claims a nuclear fuel rod bundle spacer uniquely constructed to address these design concerns. As disclosed therein, a spacer is formed of an array of conjoined tubular cells or ferrules surrounded by a peripheral support band, each ferrule bore thus providing a passage through which a fuel rod or other elongated element of the fuel bundle is inserted. The ferrules are spot welded together and to the peripheral support band to provide an assembly of high structural strength.

The rods or elements extending through the ferrules are centered and laterally supported therein between rigid projections or stops and resilient members. The rigid projections or stops are inwardly formed as fluted or dimpled portions of the ferrule wall at locations near the upper and lower ferrule edges to maximize the axial distance therebetween and thus enhance fuel rod support.

The resilient members take the form of slender continuous loop springs of generally elliptical shape held captive by oppositely directed tabs formed by C-shaped cutouts in the walls of a pair of adjacent ferrules, whereby the two sides of each spring member project into the bores of its ferrule pair. Thus, a single spring serves two ferrules in biasing the fuel rods into contact with the two axially spaced pairs of stops pursuant to centering them in the ferrule bores.

To meet many of the spaces design concerns, it is important that these spacer springs exert forces within a specified range on the fuel rods, so as to maintain their contact with the stops and thus centered in the ferrule bores under all reactor operating conditions. To little spring force and the fuel rods are susceptible to excessive vibration. Excessive spring forces will impede fuel rod insertion and blemish the rod surfaces during insertion; such blemishes having the potential of fostering future corrosion.

SUMMARY OF THE INVENTION

It is accordingly an objective of the present invention to provide a gauge for measuring the forces exerted by nuclear fuel bundle spacer springs on the fuel rods once assembled in a fuel bundle. That is, the gauge of the invention is adapted to measure the spacer spring forces at the site of spacer manufacture before insertion of the fuel rods through their retaining ferrules. Thus the spring forces can be determined to be within engineering tolerance limits before the spacer is committed to use in a fuel bundle assembly. The measuring device is of compact size to accommodate the tight measurement-taking quarters involved and to facilitate hand-held utilization.

To these ends, the spacer spring force gauge of the present invention includes an elongated probe and an alignment rod mounted in parallel, appropriately spaced relation by a handle. The probe and alignment rod have effective diameters equal to the nominal diameter of a fuel rod. Thus, when the probe and alignment rod are inserted through a pair of ferrules in which the double-acting spacer spring is held captive, they simulate the presence of fuel rods. An elongated arm is pivotally mounted intermediate its ends internally of the probe in parallel relation with the probe axis. One end of the arm is acted upon by a plunger mounted for reciprocation transversely of the probe axis, while the upper arm end acts on a load cell. The face of the plunger bears against one side of the spacer spring to communicate the spring force to the load cell via the arm as the alignment rod preloads the other side of the spring from the adjacent ferrule. The electrical response of the load cell is brought out via leads routed through the handle to equipment for registering the magnitude of the fuel rod-centering force exerted by the spring.

The invention accordingly comprises the features of construction, combination of elements and arrangement of parts, all as described hereinafter, and the scope of the invention will be indicated in the claims.

BRIEF DESCRIPTION OF THE DRAWING

For a full understanding of the nature and objects of the present invention, reference may be had to the following Detailed Description taken in conjunction with the accompanying drawing in which.

Corresponding reference numerals refer to like parts throughout the several views of the drawing.

DETAILED DESCRIPTION

Figure 1:
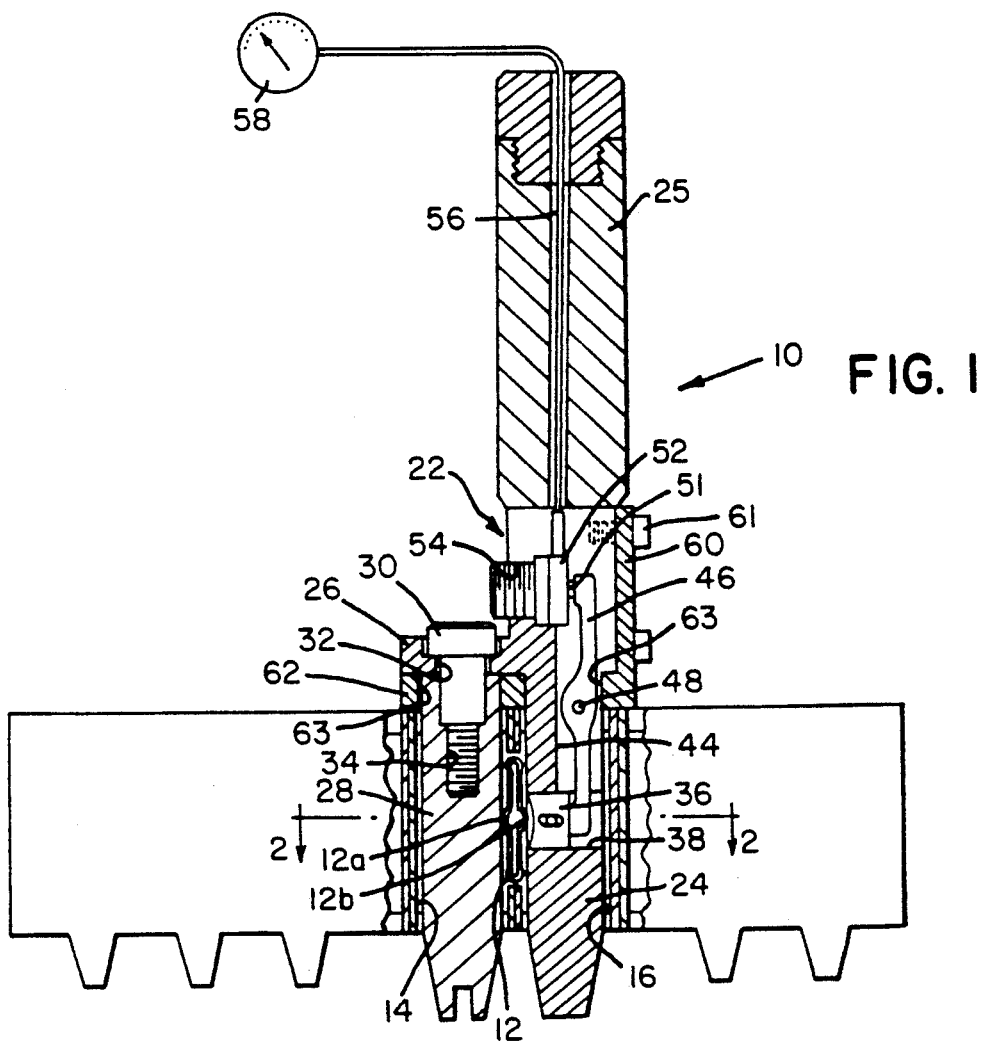
FIG. 1 is an elevational view, partially in section, of a nuclear fuel bundle spacer spring force gauge constructed in accordance with an embodiment of the present invention.

The spring force gauge of the present invention, generally indicated at 10 in FIG. 1, is illustrated in position to measure the fuel rod-centering force of a spring 12 assembled with a pair of ferrules 14 and 16 of a nuclear fuel bundle spacer, generally indicated at 18. For details of the spacer construction, reference may be had to the above-cited Matzner et al. Patent, the disclosure of which is specifically incorporated herein by reference. As mentioned above in connection with this patent, spring 12 is a double-acting loop spring of generally elliptical shape having one resilient side 12a acting in ferrule 14 and a second resilient side 12b acting in ferrule 16. Thus, spring side 12a exerts a force on a fuel rod (not shown) inserted through ferrule 14 to bias it against inwardly formed stops 20, best seen in FIG. 2, thereby maintaining the fuel rod centered within the ferrule bore. Spring side 12b performs the same function with respect to a fuel rod inserted through ferrule 16. Gauge 10 is uniquely structured to accurately measure the fuel rod-centering force exerted by the individual spring sides 12a, 12b to determine if the spring force meets quality assurance standards.

Figure 2:
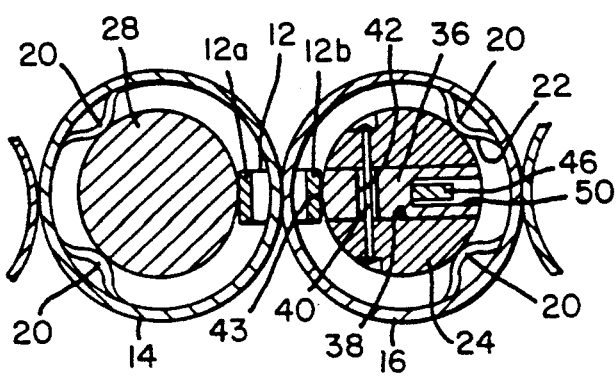
FIG. 2 is a sectional view taken along line 2—2 of FIG. 1.

Thus, as seen in FIGS. 1 and 2, gauge 10 includes a probe, generally indicated at 22, having an elongated cylindrical body 24 for insertion into a ferrule, ferrule 16 in the drawing. The upper end of the probe body is joined with a handle 25 to accommodate manual manipulation of the gauge into spring force gauging position. A flange 26, extending laterally from the probe body, serves to mount a cylindrical alignment rod 28 via a shouldered bolt 30 extending through a clearance hole 32 in the flange and threaded into a counter-sunk and tapped axial bore 34 in the alignment rod. Thus, as probe 22 is inserted into ferrule 16, alignment rod 28 is inserted into ferrule 14.

The diameters of the alignment rod and the probe body are each equal to the nominal diameter of a fuel rod, and thus their insertions into the ferrule bores simulate the presence of fuel rods. The shoulder of bolt 30 bottoms out on the shoulder of bore 34 before the bolt head can clamp down on flange 26 to provide for limited floating motion of the alignment rod relative to the probe body. This feature accommodates acceptably minor nonparallelism between the axes of the alignment rod and the probe body as spring 12 forces them against stops 20 and into centered portions in their respective ferrule bores.

A plunger 36 is received in a transverse bore 38 formed in the probe body and is loosely captured therein by a roll pin 40 passing through a transversely elongated hole 42 in the plunger. Thus the plunger is free for limited reciprocation in its bore. The axial location of the plunger is such that its face 43, of a curvature corresponding to that of a fuel rod peripheral surface, confronts and is acted upon by side 12b of the spring, while spring side 12a is being loaded by the presence of the alignment rod in ferrule 14. The plunger is then subjected to the fuel rod-centering force exerted by spring side 12b in ferrule 16.

To measure this force, the probe body is formed with an axially elongated slot 44 opening at its lower end into transverse 38 for accommodating an elongated arm 46 pivotally mounted to the probe body at a mid-length point by a roll pin 48. The lower end of the arm extends into a slot 50 formed in the plunger to present a contact surface in engagement with plunger at the bottom surface of the slot. The upper end of the arm is positioned to engage the tip 51 of a miniature load cell 52 threadedly received in a transverse tapped bore 54 formed in the probe body. The load cell may be of a conventional button strain gauge type, such as an Omega model LCK-25 available from Omega Engineering of Stamford, Connecticut.

It is thus seen that the fuel rod centering force exerted by side 12b of the spring on plunger 36 is precisely communicated to the load cell 52 by pivoting arm 46. The resulting deflection of the load cell tip 51 is translated into an electrical signal proportional to the spring force, which is fed via wires 56 routed through handle 25 to a force-reading meter 58. Alternately, the load cell signals may be fed to a data acquisition system where they are computer processed and recorded for subsequent printout of the spring forces and spring locations for each spacer. The threaded mounting of the load cell permits adjustment of the transverse position of the load cell tip for calibration purposes and to adjustably position the plunger for fuel rods of differing nominal diameters.

Completing the description of the gauge construction, an L-shaped spacer cover includes a vertical portion 60 affixed to probe body 24 by screws 61 and a lateral portion 62 having holes 63 through which alignment rod 28 and the cylindrical portion of the probe body extend. The lateral portion serves a spacing function by engaging the upper edges of the ferrules to control the depth of alignment rod-probe insertion and thus ensure that the plunger face is properly aligned with the spring side whose fuel rod-centering force is to be measured.

The present invention thus provides a compact handheld gauge which is conveniently inserted into the multiple ferrules of a nuclear fuel bundle spacer in succession to accurately measure the fuel rod-centering spring forces acting in each ferrule. This quality assurance test can be performed expeditiously to qualify spacers at their manufacturing site for use in nuclear fuel bundles.

It is seen from the foregoing Detailed Description that the objectives of the present invention are efficiently attained, and, since certain changes may be made in the construction set forth, it is intended that matters of detail be taken as illustrative and not in a limiting sense.

Having described the invention, what is claimed as new and desired to secure by Letter patent is:

1. A gauge for measuring the centering forces exerted on fuel rods assembled in a nuclear fuel bundle by double-acting springs assembled with different pairs of ferrules in a bundle spacer, wherein each spring has a first resilient side acting in a first ferrule of each pair and a second resilient side acting in a second ferrule of each pair, said gauge comprising, in combination:
   A. an alignment rod for insertion into the first ferrule of a selected ferrule pair to simulate the presence of a fuel rod and thus load the first side of a spring assembled therewith; and
   B. a probe for insertion into the second ferrule of the selected ferrule pair to simulate the presence of a fuel rod, said probe including a force responsive device mechanically coupled with the second side of the spring to indicate the centering force that would be exerted by the spring on a fuel rod inserted through the second ferrule.

2. The gauge defined in claim 1, wherein said alignment rod and said probe have effective diameters equal to a fuel rod nominal diameter.

3. The gauge defined in claim 2, which further includes a handle commonly mounting said alignment rod and said probe in parallel spaced relation.

4. The gauge defined in claim 3, wherein said force responsive device is a load cell.

5. The gauge defined in claim 4, wherein said load cell develops electrical signals proportional to spring force, said gauge further including means electrically connected with said load cell and responsive to said electrical signals for providing an indication of the force exerted by said second side of the spring.

6. The gauge defined in claim 2, wherein said probe further includes a body having an axis oriented substantially parallel with the axis of the second ferrule upon insertion therein and a plunger mounted by said body for movement transversely of said body axis and having a face simulating a peripheral surface portion of a fuel rod, said plunger face disposed in engagement with the second spring side.

7. The gauge defined in claim 6, wherein said probe further includes an elongated arm having first and second ends, said arm pivotally mounted intermediate said first and second ends to said probe body, said first arm end engaging said plunger and said second arm end engaging said force responsive device, whereby, the centering force exerted by the second side of the spring is transferred to said force responsive device by said arm.

8. The gauge defined in claim 7, wherein said force responsive device is a load cell.

9. The gauge defined in claim 8, wherein said load cell is threadedly engaged in a tapped bore formed in said probe body in transverse relation to said body axis to accommodate adjustment of the transverse position of said load cell and thus the transverse position of said plunger prior to engagement by the second side of the spring.

10. The gauge defined in claim 9, which further includes a handle commonly mounting said alignment rod and said probe in parallel spaced relation.

11. The gauge defined in claim 10, wherein said alignment rod is mounted to said probe body for limited floating movement relative thereto.

12. The gauge defined in claim 10, wherein said load cell develops electrical signals proportional to spring force, said gauge further including means electrically connected with said load cell and responsive to said electrical signals for providing an indication of the force exerted by said second side of the spring.

* * * * *